_United States Patent_ [19]

McClure

[11] 3,828,485

[45]* Aug. 13, 1974

[54] REINFORCED ABRASIVE WHEELS

[76] Inventor: Charles A. McClure, R.D. 2, Box 290, Malvern, Pa. 19355

[ * ] Notice: The portion of the term of this patent subsequent to Feb. 20, 1990, has been disclaimed.

[22] Filed: Feb. 1, 1973

[21] Appl. No.: 328,748

Related U.S. Application Data

[63] Continuation-in-part of Ser. No. 188,338, Oct. 12, 1971, Pat. No. 3,716,950.

[52] U.S. Cl. ............................ 51/206 NF, 51/207
[51] Int. Cl. ............................................ B24d 5/08
[58] Field of Search............ 51/206 NF, 206 R, 207; 52/600, 659; 125/15

[56] References Cited
UNITED STATES PATENTS

| | | | |
|---|---|---|---|
| 1,537,790 | 5/1925 | Alpe | 51/206 NF |
| 2,826,016 | 3/1958 | Hurst | 51/206 NF |
| 3,716,950 | 2/1973 | McClure | 51/206 NF |

_Primary Examiner_—Charles A. McClure

[57] ABSTRACT

Abrasive cut-off wheels are reinforced by one or more disc-like layers of open-mesh triaxial fabric, made of glass or other suitable yarn. The mesh openings comprise two or more different sets, such as a set of triangular openings of intermediate size, a set of smaller triangular or hexagonal openings, and a set of larger lozenge-shaped openings. In such reinforced abrasive wheels, a simple fabric layer may be sandwiched by layers of bonded abrasive material, or a pair of fabric layers may sandwich and be bonded to an intervening layer of abrasive material.

10 Claims, 6 Drawing Figures

REINFORCED ABRASIVE WHEELS

This is a continuation-in-part of my similarly entitled copending patent application, Ser. No. 188,338 filed 12 October 1971, now U.S. Pat. No. 3,716,950.

This invention relates to abrasive wheels or rotary blades reinforced with one or more layers of fabric.

Fabric-reinforced abrasive wheels are known and are especially useful as cut-off wheels for masonry materials. For economical construction the reinforcing fabric is used as a facing material, partially embedded into the side (usually both sides) of such a wheel, although it is also known to sandwich it between two layers of abrasive material, subsequently bonded together in conventional manner.

With ordinary biaxially woven fabric, in which warp and filling yarns intersect at right angles (orthogonally), attempts to impart the desired reinforcing strength to the wheel may lead to use of too heavy or close-meshed fabric, which impairs bonding of the abrasive material to the fabric and also, with facing fabric, hinders the cutting action of the blade. Reinforcing fabric composed of glass yarns, which are strong but slippery, requires prebonding to maintain its weave during manufacturing and does not eliminate the foregoing problems even in the necessarily close mesh normally used, such as in the range from two and a half to seven (per inch).

A primary object of the present invention is improvment in the structure of fabric-reinforced abrasive wheels.

Another object is improvement in the functioning of fabric-reinforced abrasive wheels.

A further object is accomplishment of the foregoing objects in economical fashion.

Other objects of the invention, together with means and methods for attaining the various objects, will be apparent from the following description, and the accompanying diagrams.

In general, the objects of the present invention are accomplished in an abrasive wheel characterized by component reinforcing material comprising at least one layer of open-mesh woven triaxial fabric having a plurality of sets of diverse mesh openings. By "diverse" is meant that, while the openings within each set are substantially alike, the openings of the respective sets are unlike in size or shape (or both).

Figure 1:
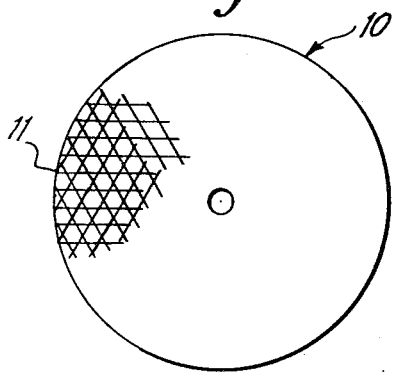
FIG. 1 is a side elevation of an abrasive wheel faced with triaxial fabric.

FIG. 1 shows abrasive wheel 10 faced with triaxial fabric 11, and having a central opening to receive a saw spindle (not shown) for supporting and rotating the wheel.

Figure 2:
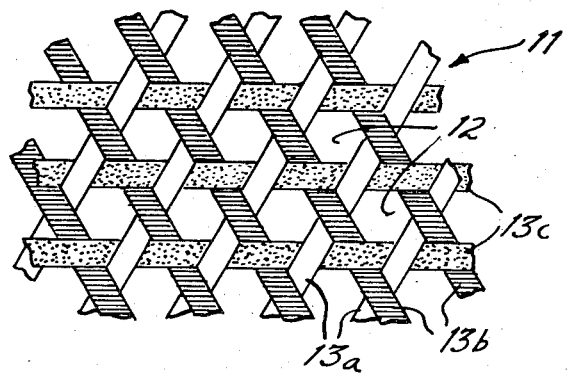
FIG. 2 is a schematic flat view, on an enlarged scale, of triaxial fabric with uniform mesh openings.

FIG. 2 shows fabric 11 on a much larger scale than in the preceding view. Respective component yarns 13a, 13b, and 13c are variously shown, in accordance with whichever of the three axes they parallel: 13a, unshaded; 13b, shaded; and 13c, stippled. For clarity the yarns themselves are somewhat exaggerated in lateral dimension, giving mesh openings 12 a hexagonal, rather than triangular, appearance. In actuality either appearance may prevail, depending upon the relative lateral spacing and diameter of the yarns in the fabric.

Figure 3:
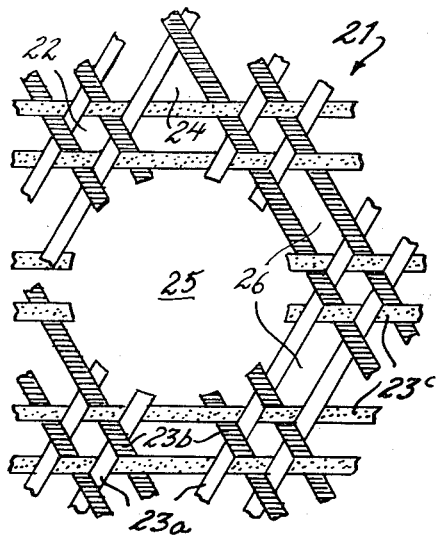
FIG. 3 is a similar view of another pattern of triaxial fabric, useful according to this invention.

FIG. 3 shows, on a like scale, triaxial fabric 21 according to this invention, having several different sets of mesh openings, as follows: triangular openings 24 of intermediate size, smaller hexagonal openings 22 (which may be triangular instead), and larger lozenge-shaped openings 26. Central opening 25, formed by stamping out a disc of the fabric, subsequently accommodates the spindle of a saw mechanism in which a blade reinforced with such fabric is useful. It will be apparent that the fabric of FIG. 3 corresponds in weave to that of FIG. 2 less every third yarn "course" along each of the three axes. The respectively directed yarns in FIG. 3 are designated as 23a, 23b, and 23c.

Such triaxial fabrics (as well as others) are disclosed in Dow U.S. Pat. No. 3,446,251. Machinery for weaving triaxial fabrics is disclosed by Skelton in Textile Research Journal, 41:637, August 1971.

Figure 4:
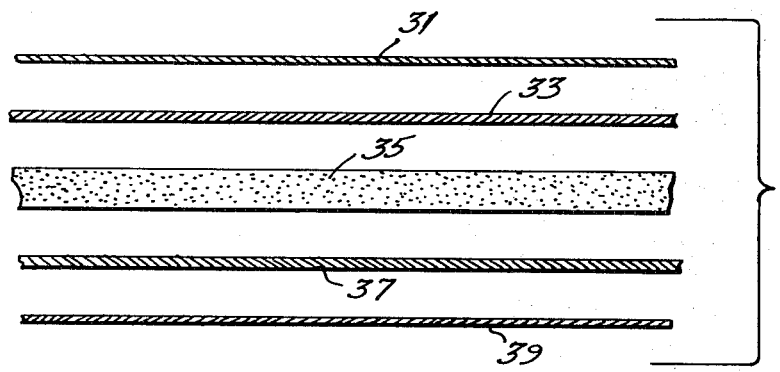
FIG. 4 is an exploded edge elevation of such fabric and other components of an abrasive blade of this invention preparatory to formation by molding or pressing.

FIG. 4 shows schematically, exploded in elevation, upper and lower plates 31 and 39 sandwiching the component materials of such an abrasive wheel, including upper and lower layers 33 and 37 of triaxial fabric, themselves sandwiching thicker layer of abrasive material 35.

It will be understood that the items shown in FIG. 4 are compressed vertically (and usually heated sufficiently) to bond the abrasive granules of the middle layer to one another and to the facing layers in a suitable mold. The abrasive and bonding components are similarly conventional, comprising an abrasive, which may be alumina, silicon carbide, boron nitride, or other suitably abrasive material, and a bonding component, such as phenol-formaldehyde or other thermosetting resin or a cold-curing resin or a suitably hardenable rubber, for example.

Figure 5:
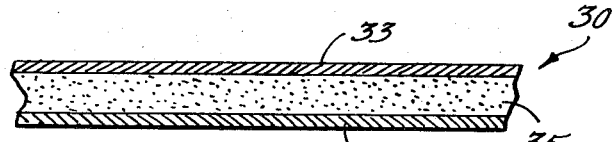
FIG. 5 is a fragmentary transverse section through an externally reinforced abrasive wheel so formed.
Figure 6:
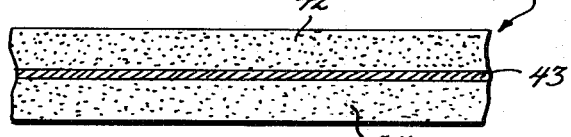
FIG. 6 is a similar section through an internally reinforced wheel so formed.

FIG. 5 shows, fragmentarily, resulting abrasive wheel or rotary blade 30 composed of central layer 35 of abrasive material sandwiched by upper and lower facing layers of such fabric. FIG. 6 shows alternative wheel 40 composed of upper and lower layers 42 and 44 of abrasive material sandwiching intermediate triaxial fabric layer 43. Of course, if desired, both intermediate and facing layers of such fabric may be used together, with layered abrasive material intervening, for a highly reinforced wheel. The open meshes of the fabric are filled with the abrasive material and bonded thereto during the molding, pressing, or curing steps, thereby forming a unitary product.

The fabrics used according to this invention are inherently stable, as woven, by reason of the mutual contiguity of all three courses at their crossover locations. Such a stability effect so obtained is absent, of course, from orthogonally woven open-mesh fabrics, in which the warp yarns and the filling yarns intersect relatively loosely at ninety degrees. Accordingly, whereas such biaxial fabrics require considerable structural stabilization by resin-impregnation or similar prebonding treatment preparatory to use as reinforcement, triaxial fabrics as specified herein may be used with little added stabilizing agent or treatment or, in some instances, none at all. Leno, basket, or similar weaves, such as often are employed in biaxial fabrics to aid in stabilizing them, are unnecessary (although permissible) in triaxial fabrics used according to the present invention.

Glass yarn is suitable in such reinforcing fabric. Also appropriate are yarns of synthetic organic composition, such as an aromid (i.e., a fiber-forming aromatic polyamide), having high tensile and bending moduli similar to or even greater than those of glass but handling much like nylon. Such an organic-based fabric is especially suitable from the standpoint of dimensional stability as compared with the slipperiness of glass and may be essentially self-bonding, especially under appropriate heating.

Less reinforcing yarn is required according to this invention because triaxial fabrics have a high degree of isotropy, in contrast to the anisotropy of orthogonally woven fabrics, which are notably weak in the diagonal directions. A lightweight fabric is more economical to start with, and the resulting lesser degree of covering of the abrasive wheel face makes for more efficient cutting, which is another welcome economy for the wheel user. Moreover, not only may the overall denier be reduced substantially, such as up to about one-third (usually at least several hundred denier) without reinforcement loss, but in the non-uniform mesh of FIG. 3 the length of a side of even the smallest set of mesh openings can be satisfactorily a half inch long or even longer, whereas a mesh of five to the inch is a common value for orthogonal weaves.

Instead of circular disc-like layers of fabric extending from the central spindle opening to the peripheral edge of the abrasive wheel, the fabric may be in the form of inscribed triangular pieces; when used at opposite sides of a wheel the pieces are oriented out-of-phase 30° azimuthally, so that the apexes of each overlie (and extend beyond) the sides of the other, thereby leaving a minimum of the wheel body free of reinforcing fabric. The quantity of fabric required in such "semi-reinforced" construction is no more than half that required for full reinforcement. The reduction in reinforcement resulting from such modification is less in the instance of triaxial fabric than when biaxial is used, and the bowing or warping tendency often present is minimized or eliminated.

In addition to the aforementioned economies in manufacture and use, an open-mesh fabric construction having a plurality of sets of mesh openings provides the further advantage of reducing or eliminating possible natural modes of vibration characteristic of blades having a uniform overall pattern of such structure. Blades having fabric reinforcement with three sets of mesh openings, all differing in size and shape (e.g., as shown in FIG. 3), are especially desirable for such reason.

Notwithstanding the description and illustration of certain embodiments of this invention, modifications may be made therein, as by adding, combining, or subdividing parts or steps, or by substituting equivalents while retaining many or most of the advantages and benefits of the present invention. The invention itself is defined in the following claims.

What is claimed is:

1. Abrasive wheel including component reinforcing material comprising at least one layer of open-mesh triaxial fabric having a plurality of sets of diverse mesh openings.

2. Abrasive wheel according to claim 1, wherein the length of a side of at least one set of mesh openings is at least one-half inch.

3. Abrasive wheel according to claim 1, wherein the reinforcing fabric is composed of glass yarn.

4. Abrasive wheel according to claim 1, wherein the reinforcing fabric is composed of aromatic polyamide yarn.

5. Abrasive wheel including component reinforcing material comprising at least one disc-like layer of open-mesh triaxial fabric having at least three different sets of mesh openings.

6. Abrasive wheel according to claim 5, wherein the fabric mesh includes a set of triangular openings of intermediate size, a set of smaller triangular or hexagonal openings, and a set of larger lozenge-shaped openings.

7. Abrasive wheel according to claim 6, wherein the mesh design is symmetrical relative to the axis of rotation thereof.

8. Abrasive cut-off wheel comprising a layer of bonded abrasive material sandwiched by a pair of layers of triaxial reinforcing fabric bonded thereto and having an open-mesh weave with a plurality of diverse mesh openings.

9. Abrasive cut-off wheel comprising a layer of triaxial reinforcing fabric, having an open-mesh weave with a plurality of diverse mesh openings, and a pair of layers of bonded abrasive material sandwiching and bonding the fabric layer.

10. As reinforcement for a wheel-like member rotatable about an axis, the improvement comprising at least one layer of open-mesh triaxial fabric, having a plurality of sets of diverse openings, being oriented in a plane essentially perpendicular to the axis of rotation, and integral with the member.

* * * * *